US012062340B2

(12) United States Patent
Kim et al.

(10) Patent No.: US 12,062,340 B2
(45) Date of Patent: Aug. 13, 2024

(54) DISPLAY DEVICE

(71) Applicant: LG Display Co., Ltd., Seoul (KR)

(72) Inventors: Jiyun Kim, Seoul (KR); Jung-Min Lee, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/990,170

(22) Filed: Nov. 18, 2022

(65) Prior Publication Data

US 2023/0206858 A1 Jun. 29, 2023

(30) Foreign Application Priority Data

Dec. 23, 2021 (KR) ........................ 10-2021-0186104

(51) Int. Cl.
*G09G 3/32* (2016.01)
*G09G 3/3275* (2016.01)

(52) U.S. Cl.
CPC ... *G09G 3/3275* (2013.01); *G09G 2300/0842* (2013.01); *G09G 2310/0272* (2013.01); *G09G 2310/061* (2013.01)

(58) Field of Classification Search
CPC ......... G09G 3/3275; G09G 2300/0842; G09G 2310/0272; G09G 2310/061; G09G 2300/0452; G09G 2300/0819; G09G 2300/0861; G09G 2320/0223; G09G 2320/0242; G09G 2320/043; G09G 3/3233; G09G 3/3208; G09G 3/2074; G09G 2320/0214; G09G 2320/0666
See application file for complete search history.

(56) References Cited

U.S. PATENT DOCUMENTS

| | | | | |
|---|---|---|---|---|
| 9,823,729 | B2 | 11/2017 | An et al. | |
| 10,004,124 | B1 * | 6/2018 | Ko | G09G 3/3233 |
| 10,551,903 | B2 | 2/2020 | An et al. | |
| 10,621,922 | B2 * | 4/2020 | Oh | G09G 3/3233 |
| 11,543,919 | B2 * | 1/2023 | Han | G06F 3/0446 |
| 2016/0124491 | A1 * | 5/2016 | An | G06F 1/3265 713/323 |
| 2018/0074569 | A1 | 3/2018 | An et al. | |
| 2021/0126080 | A1 * | 4/2021 | Kim | H10K 59/131 |
| 2022/0044636 | A1 * | 2/2022 | Mou | G09G 3/3258 |
| 2022/0284860 | A1 * | 9/2022 | Lin | G09G 3/3266 |
| 2022/0367590 | A1 * | 11/2022 | Yang | H10K 50/813 |

FOREIGN PATENT DOCUMENTS

KR 10-2288351 B1 8/2021

* cited by examiner

*Primary Examiner* — Ibrahim A Khan
(74) *Attorney, Agent, or Firm* — Fenwick & West LLP

(57) ABSTRACT

According to an aspect of the present disclosure, a display device includes a substrate in which a plurality of sub pixels having different areas is defined; a plurality of light emitting elements each on a corresponding one of the plurality of sub pixels and includes an anode and a cathode; a first anode reset line which is connected to some of the plurality of sub pixels and outputs a first anode reset voltage to anodes of the some of the plurality of sub pixels; and a second anode reset line which is connected to remaining sub pixels of the plurality of sub pixels and outputs a second anode reset voltage to anodes of the remaining sub pixels. Accordingly, according to the present disclosure, different anode reset voltages are applied according to areas of the plurality of sub pixels so that the voltage deviation and the color variation of the anode according to the areas of the plurality of sub pixels may be reduced.

17 Claims, 6 Drawing Sheets

DISPLAY DEVICE

CROSS-REFERENCE TO RELATED APPLICATION

This application claims the priority of Republic of Korea Patent Application No. 10-2021-0186104 filed on Dec. 23, 2021, in the Korean Intellectual Property Office, the disclosure of which is hereby incorporated by reference in its entirety.

BACKGROUND

Field

The present disclosure relates to a display device, and more particularly, to a display device which reduces color variation.

Description of the Related Art

As display devices which are used for a monitor of a computer, a television, or a cellular phone, there are an organic light emitting display device (OLED) which is a self-emitting device and a liquid crystal display device (LCD) which requires a separate light source.

An applicable range of the display device is diversified to personal digital assistants as well as monitors of computers and televisions and a display device with a large display area and a reduced volume and weight is being studied.

Among various display devices, an organic display device is a self-emitting display device so that a separate light source is not necessary, which is different from the liquid crystal display device. Therefore, the light emitting display device may be manufactured to have a light weight and a small thickness. Further, since the organic display device is driven at a low voltage, it is advantageous not only in terms of power consumption, but also in terms of the color implementation, the response speed, the viewing angle, and the contrast ratio, so that the light emitting display device is being studied as next generation displays.

SUMMARY

An object to be achieved by the present disclosure is to provide a display device in which a leakage current between sub pixels having different sizes is reduced.

Another object to be achieved by the present disclosure is to provide a display device in which a deviation of an anode voltage between sub pixels having different sizes is reduced.

Still another object to be achieved by the present disclosure is to provide a display device in which a color variation occurring according to an area of a sub pixel is reduced.

Still another object to be achieved by the present disclosure is to provide a display device which reduces a color variation when an image with a low gray scale level is displayed.

Objects of the present disclosure are not limited to the above-mentioned objects, and other objects, which are not mentioned above, can be clearly understood by those skilled in the art from the following descriptions.

According to an aspect of the present disclosure, a display device includes a substrate in which a plurality of sub pixels having different areas is defined; a light emitting element which is disposed on each of the plurality of sub pixels and includes an anode and a cathode; a first anode reset line which is connected to some of the plurality of sub pixels and outputs a first anode reset voltage to the anode; and a second anode reset line which is connected to the remaining sub pixels of the plurality of sub pixels and outputs a second anode reset voltage to the anode. Accordingly, according to the present disclosure, different anode reset voltages are applied according to areas of the plurality of sub pixels so that the voltage deviation and the color variation of the anode according to the areas of the plurality of sub pixels may be reduced.

Other detailed matters of the exemplary embodiments are included in the detailed description and the drawings.

According to the present disclosure, a leakage current caused by the difference in areas between a plurality of sub pixels may be reduced.

According to the present disclosure, a voltage deviation of an anode caused according to areas of the plurality of sub pixels is compensated.

According to the present disclosure, color variation varying depending on the area of the sub pixel may be reduced.

According to the present disclosure, when an image having a low gray scale level is displayed, the image quality degradation due to the leakage current may be reduced.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
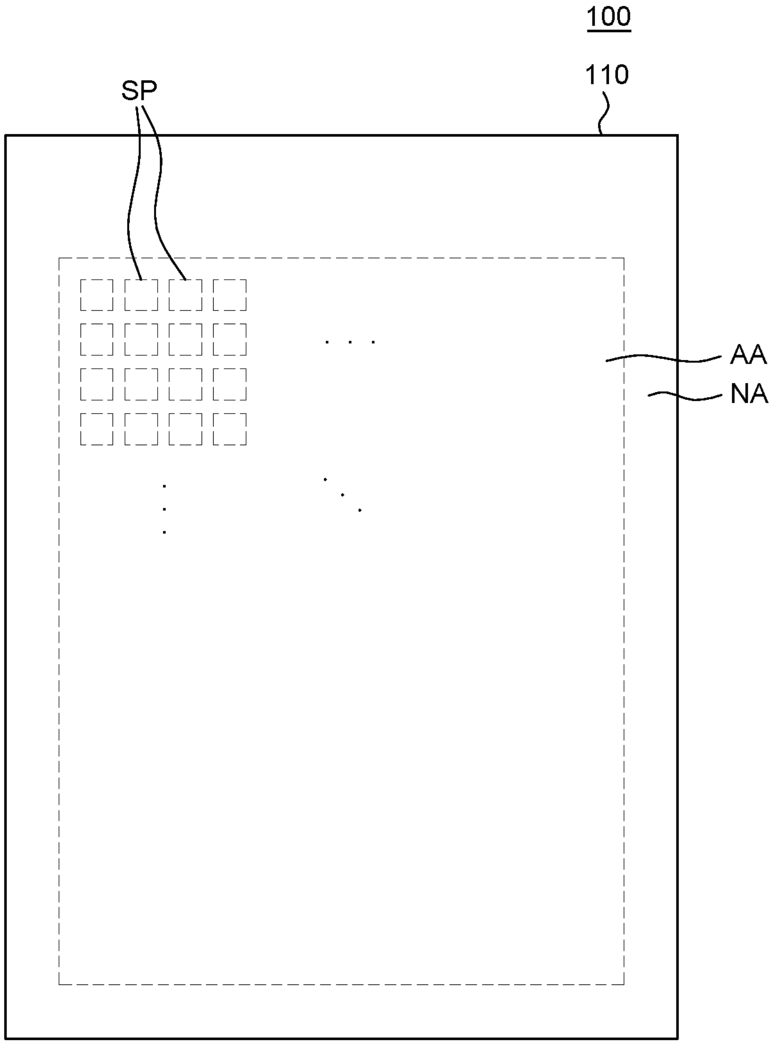
FIG. 1 is a schematic plan view of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a schematic plan view of a display device according to an exemplary embodiment of the present disclosure. In FIG. 1, for the convenience of description, among various components of the display device 100, a substrate 110 and a plurality of sub pixels SP are illustrated.

The substrate 110 is a component for supporting various components included in the display device 100 and may be formed of an insulating material. For example, the substrate 110 may be formed of glass or resin. Further, the substrate 110 may be configured to include polymer or plastics or may be formed of a material having flexibility.

The substrate 110 includes a display area AA and a non-display area NA.

The display area AA is an area where a plurality of sub pixels SP are disposed to display images. In each of the plurality of sub pixels SP of the display area AA, a light emitting element and a driving circuit for driving the light emitting element may be disposed. The light emitting element may vary depending on a type of the display device 100. For example, when the display device 100 is an organic light emitting display device, the light emitting element may be an organic light emitting element which includes an anode, an organic layer, and a cathode. In addition to this, as the light emitting element, a micro light emitting element (LED) or a quantum-dot light emitting element (QLED) including quantum dots (QD) may be further used.

The non-display area NA is an area where an image is not displayed and various wiring lines and driving ICs for driving the sub pixels SP disposed in the display area AA are disposed. For example, in the non-display area NA, various integrated circuits ICs such as a gate driver IC and a data driver IC and driving circuits may be disposed. In the meantime, the non-display area NA may be located on a rear surface of the substrate 110, that is, a surface on which the sub pixels SP are not disposed or may be omitted, and is not limited as illustrated in the drawing.

The plurality of sub pixels SP are defined in the display area AA of the substrate 110. Each of the plurality of sub pixels SP is an individual unit which emits light and in each of the plurality of sub pixels SP, a light emitting element and a driving circuit are formed. For example, the plurality of sub pixels SP may include a red sub pixel SP, a green sub pixel SP, a blue sub pixel SP and/or a white sub pixel SP, but is not limited thereto. Hereinafter, for the convenience of description, the description will be made by assuming that the plurality of sub pixels SP includes a first sub pixel SP1, a second sub pixel SP2, and a third sub pixel SP3.

Figure 2:
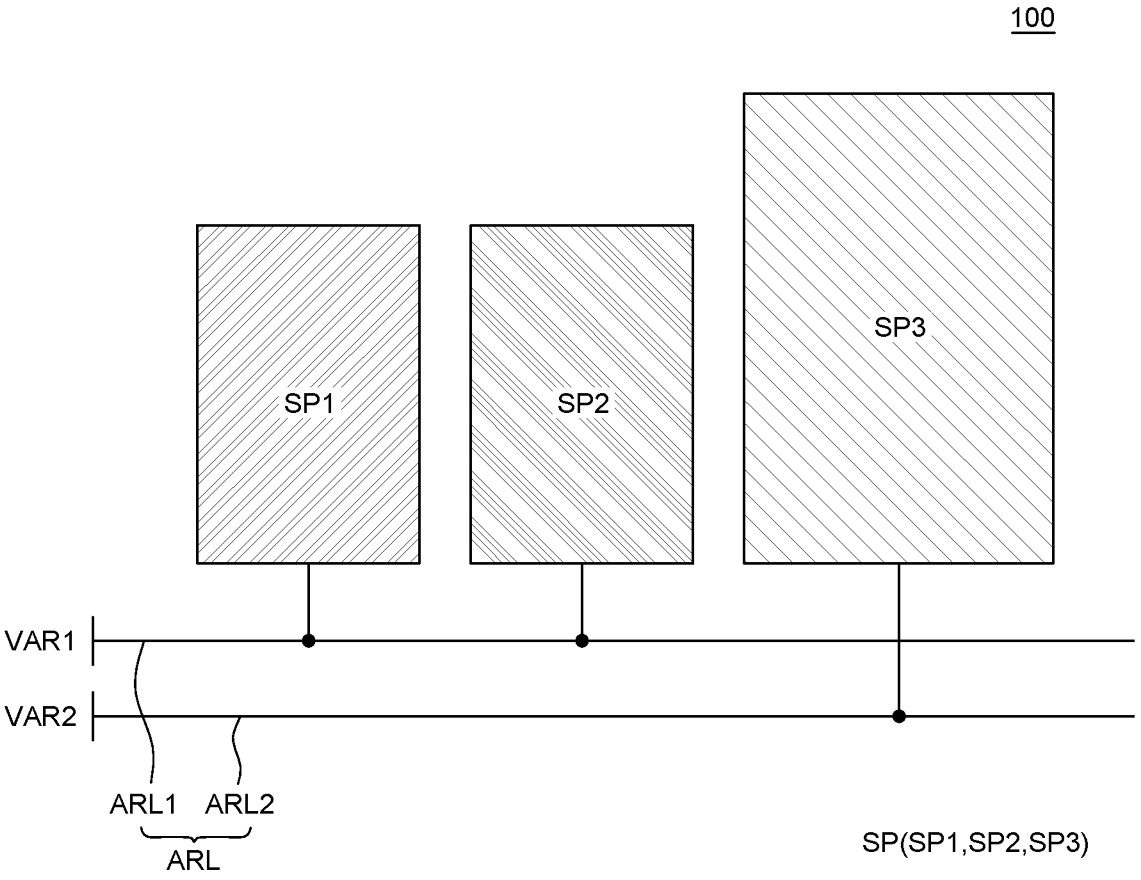
FIG. 2 is a schematic enlarged plan view of a display device according to an exemplary embodiment of the present disclosure.
Figure 3:
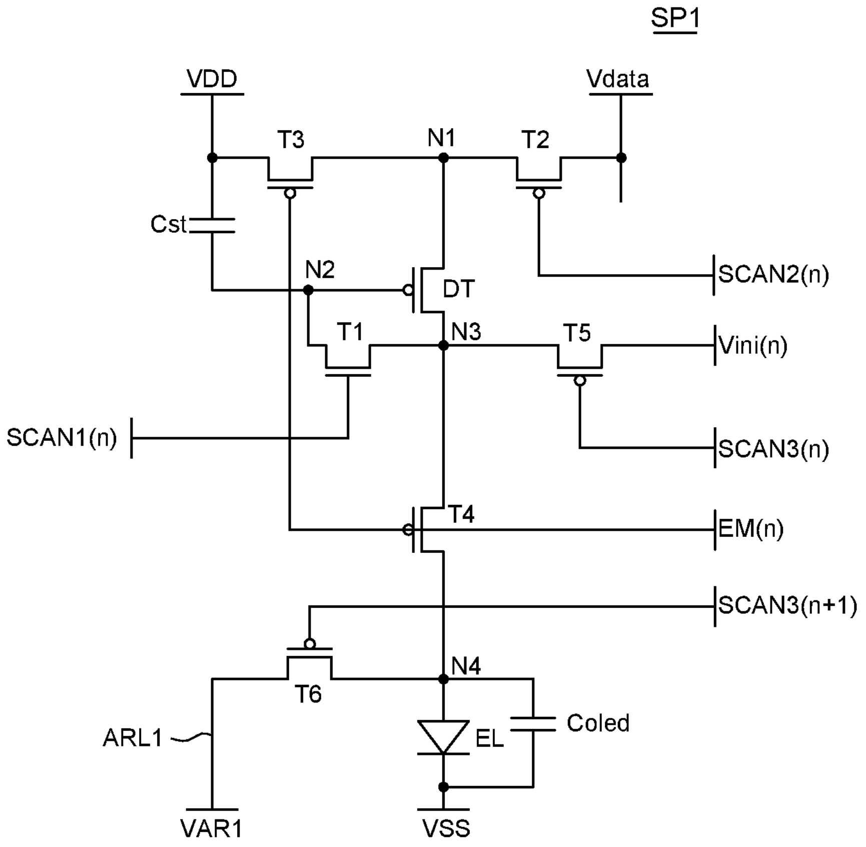
FIG. 3 is a circuit diagram of a first sub pixel of a display device according to an exemplary embodiment of the present disclosure.
Figure 4:
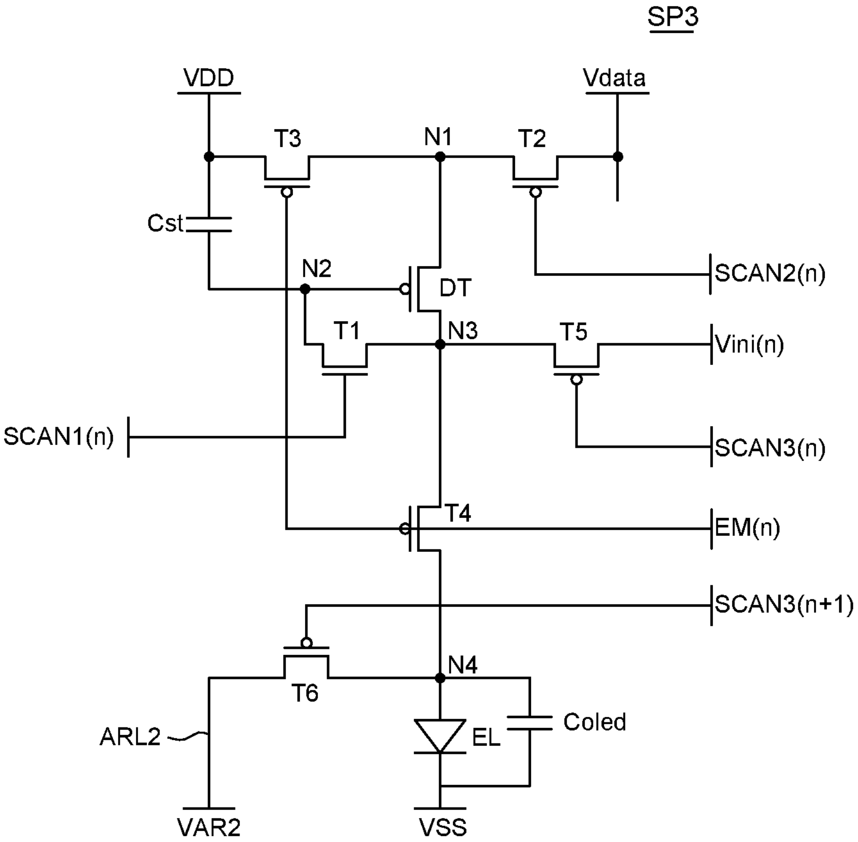
FIG. 4 is a circuit diagram of a third sub pixel of a display device according to an exemplary embodiment of the present disclosure.

FIG. 2 is a schematic enlarged plan view of a display device according to an exemplary embodiment of the present disclosure. FIG. 3 is a circuit diagram of a first sub pixel of a display device according to an exemplary embodiment of the present disclosure. FIG. 4 is a circuit diagram of a third sub pixel of a display device according to an exemplary embodiment of the present disclosure. In FIGS. 3 and 4, a first sub pixel SP1 and a third sub pixel SP3 disposed in an n-th row among the plurality of sub pixels SP are illustrated.

Referring to FIG. 2, the plurality of sub pixels SP include a first sub pixel SP1, a second sub pixel SP2, and a third sub pixel SP3. The first sub pixel SP1, the second sub pixel SP2, and the third sub pixel SP3 may emit light of different colors. For example, the first sub pixel SP1 is a red sub pixel that emits red light, the second sub pixel SP2 is a green sub pixel that emits green light, and the third sub pixel SP3 may be a blue sub pixel that emits blue light. But embodiments are not limited thereto. For example, the plurality of sub pixels SP may also include two kind subpixels or more than three kind of subpixels emitting different colors.

Sizes of the plurality of sub pixels SP may vary. The first sub pixel SP1, the second sub pixel SP2, and the third sub pixel SP3 may be designed to have different sizes by considering a lifespan or a color balance of a light emitting element EL included in each of the first sub pixel SP1, the second sub pixel SP2, and the third sub pixel SP3. For example, a size of the first sub pixel SP1 may be equal to or similar to a size of the second sub pixel SP2. A size of the third sub pixel SP3 may be the largest among the plurality of sub pixels SP.

At this time, the plurality of sub pixels SP may be connected to different anode reset lines ARL according to a size of each of the plurality of sub pixels SP. Specifically, the first sub pixel SP1 and the second sub pixel SP2 having the same size are connected to a first anode reset line ARL1. The third sub pixel SP3 having the largest size may be connected to a second anode reset line ARL2. In the display device 100 according to the exemplary embodiment of the present disclosure, the plurality of sub pixels SP are connected to different anode reset lines ARL according to the sizes of the plurality of sub pixels SP. By doing this, when the light emitting element EL emits light, a voltage deviation of a fourth node N4 may be reduced and a leakage current and a color variation may be reduced.

Specifically, referring to FIG. 3, the first sub pixel SP1 includes a first transistor T1, a second transistor T2, a third transistor T3, a fourth transistor T4, a fifth transistor T5, a sixth transistor T6, a driving transistor DT, a storage capacitor Cst, and a light emitting element EL. Further, the first sub pixel SP1 is connected to a plurality of scan lines, a data line, an emission control signal line, an initialization line, a first anode reset line ARL1, a high potential power line, and a low potential power line.

The first sub pixel SP1 includes a plurality of transistors. At this time, the plurality of transistors may be formed of different types of transistors. For example, one transistor among the plurality of transistors may be a transistor having an oxide semiconductor as an active layer. The oxide semiconductor material has a low off-current so that the oxide semiconductor material is appropriate for a switching transistor which maintains a short turn-on time and a long turn-off time.

As another example, another transistor among the plurality of transistors may be a transistor having low temperature poly-silicon (LTPS) as an active layer. The poly-silicon material has a high mobility to have a low power consumption and excellent reliability so that it may be appropriate for the driving transistor DT.

In the meantime, the plurality of transistors may be N-type transistors or P-type transistors. In the N-type transistor, carriers are electrons so that electrons may flow from a source electrode to a drain electrode and currents may flow from the drain electrode to the source electrode. In the P-type transistor, carriers are holes so that holes may flow from a source electrode to a drain electrode and currents may flow from the source electrode to the drain electrode. For example, one of the plurality of transistors may be an N-type transistor and the other one of the plurality of transistors may be a P-type transistor.

For example, the first transistor T1 may be a transistor which is an N-type transistor and has the oxide semiconductor as an active layer. Further, the driving transistor DT, the second transistor T2, the third transistor T3, the fourth transistor T4, the fifth transistor T5, and the sixth transistor T6 are P-type transistors and have the low temperature poly-silicon as an active layers. However, the material which forms the active layers of the plurality of transistors and a type of the plurality of transistors are illustrative, but is not limited thereto.

The driving transistor DT includes a gate electrode, a source electrode, and a drain electrode. The gate electrode of the driving transistor DT is connected to a second node N2, the source electrode is connected to a first node N1, and the drain electrode is connected to a third node N3. The driving current flows to the light emitting element EL through the driving transistor DT.

The first transistor T1 includes a gate electrode, a source electrode, and a drain electrode. The gate electrode of the first transistor T1 is connected to a first scan line of an n-th row and the source electrode and the drain electrode are connected between the second node N2 and the third node N3. The first transistor T1 is turned on by a first scan signal SCAN1(*n*) to electrically connect the second node N2 and the third node N3.

The second transistor T2 includes a gate electrode, a source electrode, and a drain electrode. The gate electrode of the second transistor T2 is connected to a second scan line of the n-th row and the source electrode and the drain electrode are connected between the data line and the first node N1. The second transistor T2 is turned on by a second scan signal SCAN2(*n*) to supply a data voltage Vdata to the first node N1 from the data line.

The third transistor T3 includes a gate electrode, a source electrode, and a drain electrode. The gate electrode of the third transistor T3 is connected to an emission control signal line of the n-th row and the source electrode and the drain electrode are connected between the high potential power line and the first node N1. The third transistor T3 is turned on by an emission control signal EM(n) to transmit a high potential power voltage VDD to the first node N1.

The fourth transistor T4 includes a gate electrode, a source electrode, and a drain electrode. The gate electrode of the fourth transistor T4 is connected to an emission control signal line of an n-th row and the source electrode and the drain electrode are connected to the third node N3 and the fourth node N4. The fourth transistor T4 is turned on by the emission control signal EM(n) to transmit a driving current from the driving transistor DT to the light emitting element EL.

The fifth transistor T5 includes a gate electrode, a source electrode, and a drain electrode. The gate electrode of the fifth transistor T5 is connected to a third scan line of the n-th row and the source electrode and the drain electrode are connected between the initialization line and the third node N3. When the fifth transistor T5 is turned on by a third scan signal SCAN3(*n*), the fifth transistor T5 may transmit an initialization voltage Vini(n) to the third node N3.

The sixth transistor T6 includes a gate electrode, a source electrode, and a drain electrode. The gate electrode of the sixth transistor T6 is connected to a third scan line of the n+1-th row and the source electrode and the drain electrode are connected between a first anode reset line ARL1 and the fourth node N4. The sixth transistor T6 is turned on by a third scan line SCAN3(*n*+1) to transmit a first anode reset voltage VAR1 of a first anode reset line ARL1 to the fourth node N4.

The storage capacitor Cst includes a plurality of capacitor electrodes. One of the plurality of capacitor electrodes is connected to the high potential power line and another capacitor electrode is connected to the second node N2. A voltage of the gate electrode of the driving transistor DT may be stored in the storage capacitor Cst.

The light emitting element EL includes an anode and a cathode. The anode of the light emitting element EL is connected to the fourth node N4 and the cathode is connected to the low potential power line to which a low potential power voltage VSS is supplied. The light emitting element EL may emit light by a driving current from the driving transistor DT.

Referring to FIG. 4, the third sub pixel SP3 includes the same configuration as the configuration of the first sub pixel SP1 excluding that the sixth transistor T6 is connected to the second anode reset line ARL2. Specifically, the third sub pixel SP3 includes a first transistor T1, a second transistor T2, a third transistor T3, a fourth transistor T4, a fifth transistor T5, a sixth transistor T6, a driving transistor DT, a storage capacitor Cst, and a light emitting element EL. Further, the third sub pixel SP3 is connected to a plurality of scan lines, a data line, an emission control signal line, an initialization line, a second anode reset line ARL2, a high potential power line, and a low potential power line.

The sixth transistor T6 of the third sub pixel SP3 is turned on by a third scan signal SCAN3(*n*+1) to transmit a second anode reset voltage VAR2 of a second anode reset line ARL2 to the fourth node N4.

In the meantime, even though it is not illustrated in FIGS. 3 and 4, the second sub pixel SP2 may have the same configuration as the first sub pixel SP1 as shown in FIG. 3. The second sub pixel SP2 includes a first transistor T1, a second transistor T2, a third transistor T3, a fourth transistor T4, a fifth transistor T5, a sixth transistor T6, a driving transistor DT, a storage capacitor Cst, and a light emitting element EL. The second sub pixel SP2 is connected to a plurality of scan lines, a data line, an emission control signal line, an initialization line, a first anode reset line ARL1, a high potential power line, and a low potential power line.

Hereinafter, a driving method of a sub pixel SP according to an exemplary embodiment of the present disclosure will be described with reference to FIG. 5.

Figure 5:
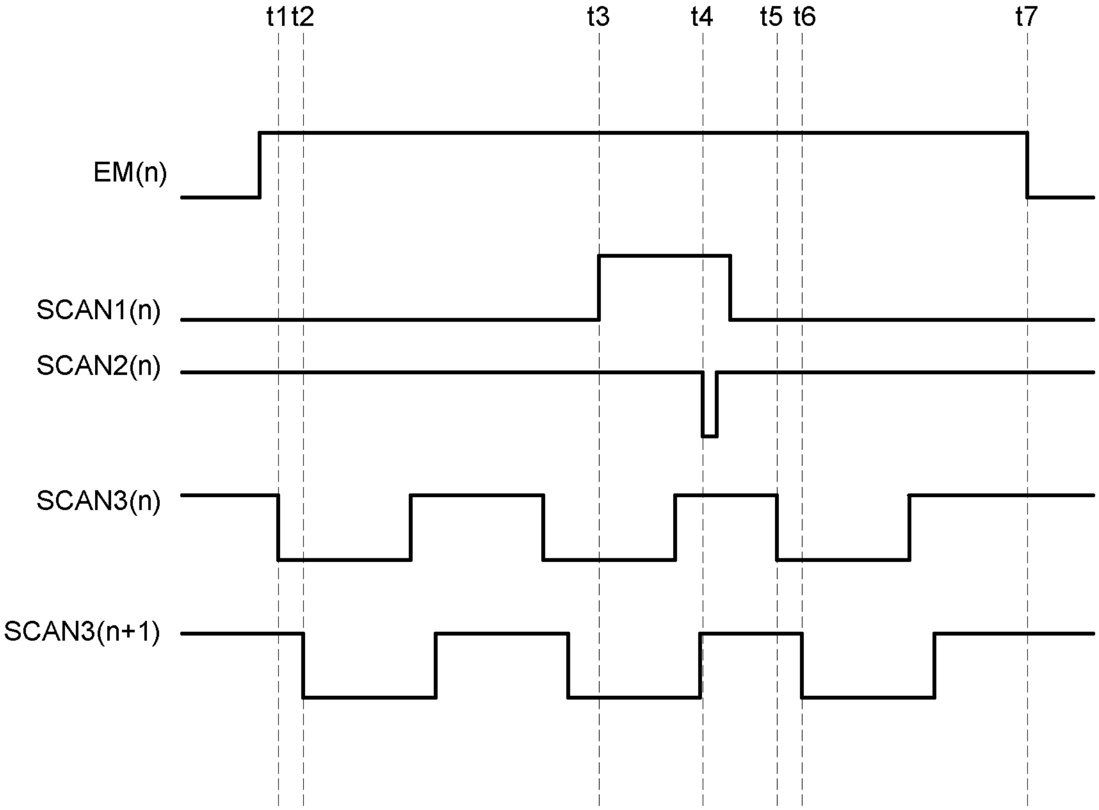
FIG. 5 is a driving timing diagram of a sub pixel of a display device according to an exemplary embodiment of the present disclosure.
Figure 6:
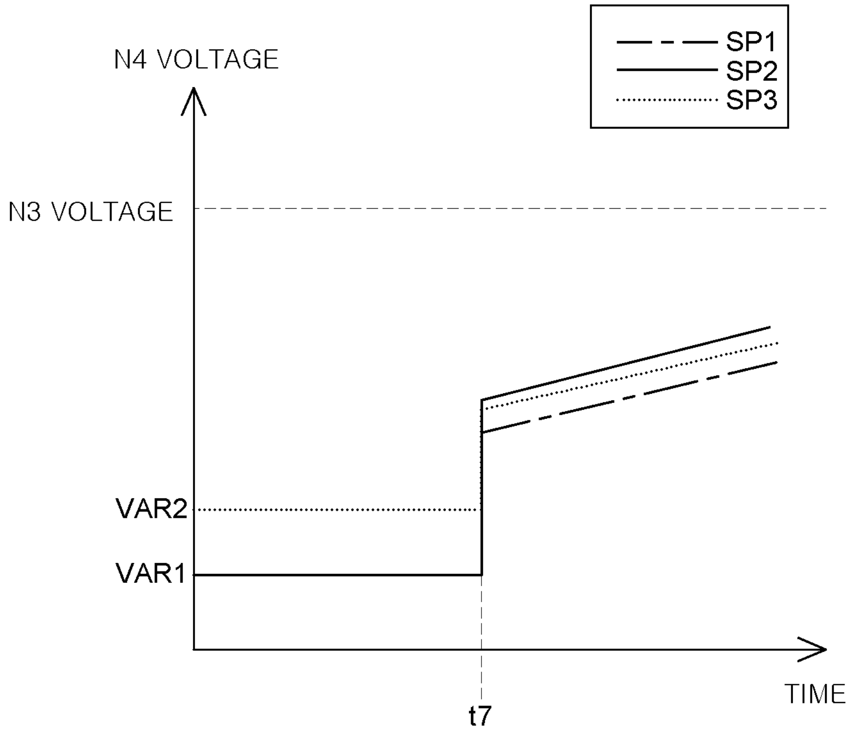
FIG. 6 is a view for explaining a voltage change of a fourth node of a display device according to an exemplary embodiment of the present disclosure.

FIG. 5 is a driving timing diagram of a sub pixel of a display device according to an exemplary embodiment of the present disclosure. FIG. 6 is a view for explaining a voltage change of a fourth node of a display device according to an exemplary embodiment of the present disclosure.

Referring to FIG. 5, a low level of third scan signal SCAN3(*n*) is output from a third scan line in an n-th row at a first timing t1. Therefore, the fifth transistor T5 is turned on so that the initialization voltage Vini(n) is transmitted to a third node N3 of each of the plurality of sub pixels SP. Accordingly, a voltage of the third node N3 may be initialized to the initialization voltage Vini(n) at the first timing t1.

Next, a low level of third scan signal SCAN3(*n*+1) is output from a third scan line in a n+1-th row at a second timing t2. In this case, the sixth transistor T6 is turned on so that the first anode reset voltage VAR1 is applied to the fourth nodes N4 of the first sub pixel SP1 and the second sub pixel SP2 and the second anode reset voltage VAR2 is applied to the fourth node N4 of the third sub pixel SP3. Accordingly, the fourth node N4 of each of the plurality of sub pixels SP may be initialized to the first anode reset voltage VAR1 or the second anode reset voltage VAR2.

Next, a high level of first scan signal SCAN1(*n*) is output from a first scan line in a n-th row at a third timing t3. The first transistor T1 is turned on by a high level of first scan signal SCAN1(*n*) and may electrically connect the second node N2 and the third node N3. The first transistor T1 is turned on so that the driving transistor DT may be in a diode connection state to serve as a diode.

Next, a low level of second scan signal SCAN2(*n*) is output from a second scan line in a n-th row at a fourth timing t4. The second transistor T2 is turned on by a second scan signal SCAN2(*n*) and may transmit a data voltage Vdata to the first node N1.

At this time, a voltage of a gate electrode of the driving transistor DT which becomes in a diode connection state by the first transistor T1 may be changed to a difference voltage of the data voltage Vdata and a threshold voltage Vth. Accordingly, in the storage capacitor Cst connected between the second node N2 which is a gate electrode of the driving transistor DT and the high potential power line, a voltage obtained by subtracting a voltage of the gate electrode of the driving transistor DT from the high potential power voltage VDD may be stored. That is, in the storage capacitor Cst, a voltage obtained by subtracting the data voltage Vdata from the high potential power voltage VDD and adding the threshold voltage Vth may be stored. Accordingly, the threshold voltage Vth of the driving transistor DT is sampled and the data voltage Vdata may be stored in the storage capacitor Cst.

Next, a low level of a third scan signal SCAN3(*n*) is output from a third scan line in a n-th row at a fifth timing t5 and a low level of a third scan signal SCAN3(*n*+1) is sequentially output from a third scan line in a n+l-th row at a sixth timing t6. At the fifth timing t5, the initialization voltage Vini(n) is applied to the third node N3 and at the sixth timing t6, the first anode reset voltage VAR1 or the second anode reset voltage VAR2 is applied to the fourth node N4 to perform on-bias stress.

The on-bias stress is a process of initializing a transistor to a specific state and the on-bias stress is performed to relieve a hysteresis of a transistor. The transistor has a hysteresis whose characteristic varies in a current frame according to an operating state in a previous frame. For example, even though a data voltage Vdata at the same voltage level is supplied to the driving transistor DT, different levels of driving currents may be generated depending on the operation state in the previous frame. Accordingly, the on-bias stress is performed on the plurality of transistors to initialize a characteristic of the transistor to a predetermined state. For example, the same on-bias stress is performed on each of the plurality of sub pixels SP to initialize a specific transistor of each of the plurality of sub pixels SP to the same state and generate light having the same luminance in all the sub pixels SP to which a data voltage Vdata at the same voltage level is supplied in a subsequent frame.

Finally, at a seventh timing t7, a low level of emission control signal EM(n) is output to an emission control signal line in a n-th row so that the light emitting element EL may emit light. The third transistor T3 and the fourth transistor T4 are turned on by the emission control signal EM(n) to transmit a driving current from the driving transistor DT to the light emitting element EL. Accordingly, the light emitting element EL may emit light with a specific luminance based on a driving current.

In the meantime, a parasitic capacitor Coled which is parasitically formed between the anode and the cathode may be formed in the light emitting element EL. At this time, a capacitance of the parasitic capacitor Coled may vary depending on an area of each of the plurality of sub pixels SP. The larger the permittivity or the area, the higher the capacitance of the parasitic capacitor Coled. In this case, as the area of the sub pixel SP is increased, the sizes of the anode and the cathode of the light emitting element EL are increased and the capacitance of the parasitic capacitor Coled may be increased. For example, the capacitance of the parasitic capacitor Coled of the third sub pixel SP3 having the largest area may be higher than capacitances of parasitic capacitors Coled of the first sub pixel SP1 and the second sub pixel SP2.

However, as the capacitance of the parasitic capacitor Coled varies according to the area of each of the plurality of sub pixels SP, a deviation of a voltage of the anode of the light emitting element EL which is a voltage of the fourth node N4 may be caused. If a voltage of a fourth node N4 of a specific sub pixel SP among the plurality of sub pixels SP is relatively high, the leakage current is transmitted to another sub pixel SP to allow another sub pixel SP to emit light. Specifically, when an image having a low gray scale level which is close to black is displayed, some sub pixels SP emit light by the leakage current so that it is difficult to express the image with a low gray scale level. Accordingly, the color variation of the light which is emitted from the sub pixel SP may be caused due to a capacitance difference of the parasitic capacitor Coled and a voltage deviation of the fourth node N4.

Accordingly, in the display device 100 according to the exemplary embodiment of the present disclosure, the plurality of sub pixels SP are connected to different anode reset lines ARL in consideration of the areas of the plurality of sub pixels SP. By doing this, a voltage deviation of the fourth node N4 may be compensated and a color variation due to the leakage current may be reduced.

Specifically, a voltage change ΔN4 of the fourth node N4 may be determined by Equation 1. $N3_{voltage}$ and $N4_{voltage}$ are voltages of the third node N3 and the fourth node N4, $N3_{cap}$ is a capacitance of the third node N3, and $N4_{cap}$ is a capacitance of the fourth node N4. $N3_{cap}$ and $N4_{cap}$ refer to a capacitance of a capacitor formed between the third node N3 and the neighboring configuration and a capacitance of a capacitor formed between the fourth node N4 and the neighboring configuration.

$$\Delta N4 = (N3_{voltage} - N4_{voltage}) \times \frac{N3_{Cap}}{(N3_{Cap} + N4_{Cap})} \quad \text{[Equation 1]}$$

At the moment when the fourth transistor T4 is turned on so that the third node N3 and the fourth node N4 are connected, the voltage of the third node N3 is distributed and the voltage of the fourth node N4 may rise. At this time, a voltage change ΔN4 of the fourth node N4, that is, a voltage rising amount of the fourth node N4 may vary depending on the capacitance of the fourth node N4.

At this time, most of the capacitance of the fourth node N4 may be formed by the parasitic capacitor Coled. That is, the capacitance of the fourth node N4 is similar to a capacitance of the parasitic capacitor Coled. However, when the areas of the plurality of sub pixels SP are different, the capacitance of the parasitic capacitor Coled may be different and the voltage change ΔN4 of the fourth node N4 may be different.

Referring to FIG. 6 together, at a seventh timing t7 when the fourth transistor T4 is turned on, the third node N3 and the fourth node N4 are connected, the voltage of the third node N3 is distributed, and the voltage of the fourth node N4 may rise. The initialization voltage Vini(n) which is a voltage of the third node N3 may be a voltage higher than the first anode reset voltage VAR1 and the second anode reset voltage VAR2. Accordingly, a voltage of the fourth node N4 may vary in a range between the first anode reset voltage VAR1 and the initialization voltage Vini(n) of the third node N3 or between the second anode reset voltage VAR2 and the initialization voltage Vini(n) of the third node N3.

At this time, in the third sub pixel SP3 having the largest area, the capacitance of the parasitic capacitor Coled of the light emitting element EL is the highest so that the voltage change ΔN4 of the fourth node N4 may be the smallest. Further, in the case of the first sub pixel SP1 and the second sub pixel SP2 having the relatively small area, the capacitance of the parasitic capacitor Coled is relatively small so that the voltage change ΔN4 of the fourth node N4 may be large.

Therefore, in the case of the third sub pixel SP3 having the smallest voltage change ΔN4 of the fourth node N4, that is, the smallest voltage rising amount of the fourth node N4, the second anode reset voltage VAR2 which has a relatively high level is applied to the fourth node N4. Further, in the case of the first sub pixel SP1 and the second sub pixel SP2 having the large voltage change ΔN4 and rising amount of the fourth node N4, first anode reset voltage VAR1 which has a relatively low level is applied to the fourth node N4.

Even though the voltage change ΔN4 of the fourth node N4 in the third sub pixel SP3 is lower than that in the first sub pixel SP1 and the second sub pixel SP2, an initial voltage of the fourth node N4 of the third sub pixel SP3 is a second anode reset voltage VAR2 having a relatively high level. Therefore, immediately after turning on the fourth transistor T4, the voltage deviation of the fourth nodes N4 of the first sub pixel SP1, the second sub pixel Sp2, and the third sub pixel SP3 may be compensated. In order to compensate for a difference of the voltage change ΔN4 of the fourth node N4 in the third sub pixel SP3 and the voltage change ΔN4 of the fourth nodes N4 in the first sub pixel SP1 and the second sub pixel SP2, the first anode reset voltage VAR1 and the second anode reset voltage VAR2 may be set. For example, when the voltage change ΔN4 of the fourth node N4 in the third sub pixel SP3 is A and the voltage change ΔN4 of the fourth nodes N4 in the first sub pixel SP1 and the second sub pixel SP2 is B, the second anode reset voltage VAR2 may be set to a value obtained by adding a difference between A and B to the first anode reset voltage VAR1. That is, the voltage of the fourth node N4 of the third sub pixel SP3 is initialized to the second anode reset voltage VAR2 and the voltages of the fourth nodes N4 of the first sub pixel SP1 and the second sub pixel SP2 are initialized to the first anode reset voltage VAR1. By doing this, the deviation of the voltage change ΔN4 of the fourth node N4 according to the difference of the parasitic capacitor Coled may be compensated and the voltage deviation between the fourth nodes N4 of the first sub pixel SP1, the second sub pixel SP2, and the third sub pixel SP3 may be reduced.

Therefore, when the fourth nodes N4 of the plurality of sub pixels SP are initialized to different anode reset voltages so that the fourth transistor T4 is turned on to connect the third node N3 and the fourth node N4, the difference of the voltage change ΔN4 of the fourth node is compensated. Further, the leakage current and the color variation thereby may be reduced.

If the same anode reset voltage is applied to the fourth nodes N4 of the first sub pixel SP1, the second sub pixel SP2, and the third sub pixel SP3, a voltage deviation of the fourth nodes N4 may be caused between the third sub pixel SP3 having a relatively small voltage change ΔN4 of the fourth node N4 and the first sub pixel SP1 and the second sub pixel SP2 having a relatively large voltage change ΔN4 of the fourth node N4. Immediately after a seventh timing t7 when the fourth transistor T4 is turned on, a voltage of the fourth node N4 of the third sub pixel SP3 which rises by the voltage of the third node N3 may be lower than voltages of the fourth nodes N4 of the first sub pixel SP1 and the second sub pixel SP2. Therefore, the voltage deviation of the fourth node N4 is generated from the seventh timing t7 when the light emitting element EL starts to emit light so that the leakage current and the color variation thereby may be caused.

Accordingly, in the display device 100 according to the exemplary embodiment of the present disclosure, an anode reset voltage applied to the fourth node N4 may be differently set in consideration of the size of each of the plurality of sub pixels SP and the capacitance of the parasitic capacitor Coled. Specifically, when the fourth transistor T4 is turned on so that the third node N3 and the fourth node N4 are connected, the voltage of the third node N3 is distributed and the voltage of the fourth node N4 may vary. At this time, the voltage change ΔN4 which is the voltage rising amount of the fourth node N4 is reduced as the capacitance of the fourth node N4 is larger and may be inversely proportional to the capacitance of the fourth node N4. At this time, the parasitic capacitor Coled of the light emitting element EL occupies most of the capacitance of the fourth node N4 so that the capacitance of the fourth node N4 may vary depending on the parasitic capacitor Coled. Further, the capacitance of the parasitic capacitor Coled increases as the size of the light emitting element EL which is the area of the sub pixel SP becomes larger. In this case, the capacitance of the parasitic capacitor Coled of the third sub pixel SP3 having the largest area is the highest so that the voltage change ΔN4 of the fourth node N4 of the third sub pixel SP3 may be the smallest. Therefore, the fourth node N4 of the third sub pixel SP3 having the largest size is initialized to the second anode reset voltage VAR2 having the relatively high level. The fourth nodes N4 of the first sub pixel SP1 and the second sub pixel SP2 having the relatively small size are initialized to the first anode reset voltage VAR1 having a relatively low level. Therefore, when the third node N3 and the fourth node N4 are connected, the voltage of the fourth node N4 of the third sub pixel SP3 rises from the second anode reset voltage VAR2 and the voltages of the fourth nodes N4 of the first sub pixel SP1 and the second sub pixel SP2 may rise from the first anode reset voltage VAR1. In this case, the voltage change ΔN4 of the fourth node N4 of the third sub pixel SP3 is smaller than the voltage change ΔN4 of the fourth nodes N4 of the first sub pixel SP1 and the second sub pixel SP2. Consequently, the voltage deviation of the fourth nodes N4 between the first sub pixel SP1, the second sub pixel SP2, and the third sub pixel SP3 may be reduced. In summary, in the third sub pixel SP3 having a low voltage rising amount of the fourth node N4, the fourth node N4 is initialized to the second anode reset voltage VAR2 having a relatively high level. In the first sub pixel SP1 and the second sub pixel SP2 having a high voltage rising amount of the fourth node N4, the fourth node N4 is initialized to the first anode reset voltage VAR1 having a relatively low level so that the deviation of the voltage change ΔN4 of the fourth node N4 may be compensated. Accordingly, in the display device 100 according to the exemplary embodiment of the present disclosure, the anode reset voltage applied to the fourth node N4 of each of the plurality of sub pixels SP may be differently configured in consideration of the size and the parasitic capacitor Coled of the plurality of sub pixels SP. Therefore, the color variation due to the voltage deviation of the fourth node N4 may be reduced.

The exemplary embodiments of the present disclosure can also be described as follows:

According to an aspect of the present disclosure, there is provided a display device. The display device includes a substrate in which a plurality of sub pixels having different areas is defined, a light emitting element which is disposed on each of the plurality of sub pixels and includes an anode and a cathode, a first anode reset line which is connected to some of the plurality of sub pixels and outputs a first anode reset voltage to the anode, and a second anode reset line which is connected to the remaining sub pixels of the plurality of sub pixels and outputs a second anode reset voltage to the anode.

The plurality of sub pixels may include a first sub pixel connected to the first anode reset line, a second sub pixel connected to the first anode reset line, and a third sub pixel connected to the second anode reset line. An area of the third sub pixel may be larger than an area of the first sub pixel and an area of the second sub pixel.

The second anode reset voltage may be higher than the first anode reset voltage.

Each of the plurality of sub pixels may include a driving transistor in which a gate electrode is connected to a second node and a source electrode and a drain electrode are connected between a first node and a third node, a first transistor in which a source electrode and a drain electrode are connected between the second node and the third node, a second transistor in which a source electrode and a drain electrode are connected between the first node and a data line, a third transistor in which a source electrode and a drain electrode are connected between a high potential power line and the first node, a fourth transistor in which a source electrode and a drain electrode are connected between the third node and a fourth node, a fifth transistor in which a source electrode and a drain electrode are connected between an initialization line and the third node, and a sixth transistor in which a drain electrode is connected to the fourth node, and the anode may be connected to the fourth node.

A source electrodes of the sixth transistors of the first sub pixel and the second sub pixel may be connected to the first anode reset line, a source electrode of the sixth transistor of the third sub pixel may be connected to the second anode reset line, and when the sixth transistor is turned on, the first anode reset voltage or the second anode reset voltage may be transmitted to the fourth node.

When the fourth transistor is turned on, a voltage of the fourth node may rise by a voltage of the third node.

When the fourth transistors of the first sub pixel and the second sub pixel are turned on, a voltage of the fourth node may vary in the range between a voltage of the third node and the first anode reset voltage, and when the fourth transistor of the third sub pixel is turned on, a voltage of the fourth node may vary in the range between a voltage of the third node and the second anode reset voltage.

When the fourth transistor is turned on, the smaller the area of each of the plurality of sub pixels, the larger a voltage change of the fourth node.

When the fourth transistor is turned on, a voltage change of the fourth node of the third sub pixel may be smaller than a voltage change of the fourth node of the first sub pixel.

When the fourth transistor is turned on, a voltage change of the fourth node of the third sub pixel may be smaller than a voltage change of the fourth node of the second sub pixel.

Each of the plurality of sub pixels may further include a parasitic capacitor between the anode and the cathode and the larger the areas of the plurality of sub pixels, the higher the capacitance of the parasitic capacitor.

When the fourth transistor is turned on, the higher the capacitance of the parasitic capacitor, the smaller a voltage change of the fourth node.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a substrate comprising a plurality of sub pixels having different areas, the plurality of sub pixels arranged across a plurality of rows of pixels;

a plurality of light emitting elements, each light emitting element on a corresponding one of the plurality of sub pixels and includes an anode and a cathode;

a first anode reset line connected to a first sub pixel from the plurality of sub pixels that is in a first row from the plurality of rows, the first anode reset line outputting a first anode reset voltage to an anode of a light emitting element from the plurality of light emitting elements that is included in the first sub pixel; and a second anode reset line connected to a second sub pixel from the plurality of sub pixels that is in the first row with the first sub pixel, the second anode reset line outputting a second anode reset voltage to an anode of a light emitting element from the plurality of light emitting elements that is included in the second sub pixel, wherein an area of the second sub pixel is larger than an area of the first sub pixel, and a magnitude of the second anode reset voltage is based on the area of the second sub pixel and a magnitude of the first anode reset voltage is based on the area of the first sub pixel and is different from the magnitude of the second anode reset voltage, and wherein a voltage change of the anode of the light emitting element in the first sub pixel is different from a voltage change of the anode of the light emitting element in the second sub pixel.

2. The display device according to claim 1, wherein the plurality of sub pixels include:

a third sub pixel connected to the first anode reset line and is in the first row with the first sub pixel and the second sub pixel, and wherein an area of the second sub pixel is larger than the area of the first sub pixel and an area of the third sub pixel.

3. The display device according to claim 2, wherein the first sub pixel and the third sub pixel are a red sub pixel and a green sub pixel, respectively, and the second sub pixel is a blue sub pixel.

4. The display device according to claim 2, wherein the second anode reset voltage is greater than the first anode reset voltage.

5. The display device according to claim 2, wherein each of the plurality of sub pixels includes:

a driving transistor in which a gate electrode of the driving transistor is connected to a second node and a source electrode and a drain electrode of the driving transistor is connected between a first node and a third node;

a first transistor in which a source electrode and a drain electrode of the first transistor are connected between the second node and the third node;

a second transistor in which a source electrode and a drain electrode of the second transistor are connected between the first node and a data line;

a third transistor in which a source electrode and a drain electrode of the third transistor are connected between a high potential power line and the first node;

a fourth transistor in which a source electrode and a drain electrode of the fourth transistor are connected between the third node and a fourth node;

a fifth transistor in which a source electrode and a drain electrode of the fifth transistor are connected between an initialization line and the third node; and a sixth transistor in which a drain electrode of the sixth transistor is connected to the fourth node, and the anode of the light emitting element included in the sub pixel is connected to the fourth node.

6. The display device according to claim 5, wherein source electrodes of sixth transistors of the first sub pixel and the second sub pixel are connected to the first anode reset line, a source electrode of the sixth transistor of the third sub pixel is connected to the second anode reset line, and responsive to the sixth transistor being turned on, the first anode reset voltage or the second anode reset voltage is transmitted to the fourth node.

7. The display device according to claim 6, wherein responsive to the fourth transistor being turned on, a voltage of the fourth node rises by a voltage of the third node.

8. The display device according to claim 6, wherein responsive to fourth transistors of the first sub pixel and the third sub pixel being turned on, a voltage of the fourth node varies in a range between a voltage of the third node and the first anode reset voltage, and responsive to the fourth transistor of the second sub pixel is turned on, a voltage of the fourth node varies in a range between a voltage of the third node and the second anode reset voltage.

9. The display device according to claim 8, wherein responsive to the fourth transistor being turned on, a smaller the area of each of the plurality of sub pixels, a larger a voltage change of the fourth node.

10. The display device according to claim 8, wherein responsive to the fourth transistor being turned on, a voltage change of the fourth node of the second sub pixel is less than a voltage change of the fourth node of the first sub pixel.

11. The display device according to claim 10, wherein the second anode reset voltage is set to a value obtained by adding a difference between the voltage change of the fourth node of the second sub pixel and the voltage change of the fourth node of the first sub pixel to the first anode reset voltage.

12. The display device according to claim 8, wherein responsive to the fourth transistor being turned on, a voltage change of the fourth node of the second sub pixel is less than a voltage change of the fourth node of the third sub pixel.

13. The display device according to claim 5, wherein each of the plurality of sub pixels further includes a parasitic capacitor between the anode and the cathode and a larger the areas of the plurality of sub pixels, a higher a capacitance of the parasitic capacitor.

14. The display device according to claim 13, wherein responsive to the fourth transistor being turned on, a higher the capacitance of the parasitic capacitor and a smaller a voltage change of the fourth node.

15. The display device according to claim 1, wherein sub pixels emitting light of a same color among the plurality of sub pixels are connected to a same anode reset line.

16. The display device according to claim 1, wherein the first anode reset voltage is less than the second anode reset voltage.

17. The display device according to claim 1, wherein the first anode reset voltage is different from the second anode reset voltage.

* * * * *